(12) United States Patent
Schalla et al.

(10) Patent No.: US 10,146,320 B2
(45) Date of Patent: Dec. 4, 2018

(54) AIRCRAFT HAVING GESTURE-BASED CONTROL FOR AN ONBOARD PASSENGER SERVICE UNIT

(71) Applicant: THE BOEING COMPANY, Chicago, IL (US)

(72) Inventors: James P. Schalla, Edmonds, WA (US); Calsee N. Robb, Seattle, WA (US); William A. Harkness, Everette, WA (US); Buddy L. Sharpe, Mill Creek, WA (US); Heidi J. Kneller, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 62 days.

(21) Appl. No.: 15/353,374

(22) Filed: Nov. 16, 2016

(65) Prior Publication Data

US 2018/0136733 A1    May 17, 2018

Related U.S. Application Data

(63) Continuation of application No. 11/927,517, filed on Oct. 29, 2007, now abandoned.

(51) Int. Cl.
*B64D 47/02* (2006.01)
*G06F 3/01* (2006.01)
(Continued)

(52) U.S. Cl.
CPC ............ *G06F 3/017* (2013.01); *B64C 1/1476* (2013.01); *B64D 11/0015* (2013.01);
(Continued)

(58) Field of Classification Search
CPC ... G06F 3/017; B64C 1/1476; B64D 11/0015; B64D 13/00; B64D 47/02; B64D 2013/003; B06K 9/00355
(Continued)

(56) References Cited

U.S. PATENT DOCUMENTS 4,347,499 A * 8/1982 Burkman, Sr. ........ B64D 25/00
182/18
4,567,547 A    1/1986 Alie et al.
(Continued)

OTHER PUBLICATIONS

Farooq et al., Developing novel multimodal interaction techniques for touchscreen in-vehicle infotainment systems, 2014, IEEE, p. 32-42 (Year: 2014).*

(Continued)

*Primary Examiner* — McDieunel Marc
(74) *Attorney, Agent, or Firm* — Womble Bond Dickinson (US) LLP

(57) ABSTRACT

An aircraft is provided that includes a passenger service unit for a passenger seated in a seat in its cabin. The aircraft includes a camera configured to acquire an image of the passenger, and a control module configured to at least receive the image of the passenger. The control module is configured to receive non-tactile gesture preference data and dominant hand data, and access a non-tactile gesture data store that includes a plurality of images of non-tactile hand signals or non-tactile hand gestures. Based on the foregoing, the control module is configured to generate non-tactile gesture data in accordance with and indicative of a non-tactile hand signal or a non-tactile gesture made by the passenger. And the control module is configured to control one or more cabin systems including in at least one instance the passenger service unit based on the non-tactile gesture data.

21 Claims, 9 Drawing Sheets

(51) Int. Cl.
*G06K 9/00* (2006.01)
*B64D 13/00* (2006.01)
*B64D 11/00* (2006.01)
*B64C 1/14* (2006.01)

(52) U.S. Cl.
CPC ............. *B64D 13/00* (2013.01); *B64D 47/02* (2013.01); *G06K 9/00355* (2013.01); *B64D 2011/0053* (2013.01); *B64D 2013/003* (2013.01)

(58) Field of Classification Search
USPC .......................................................... 701/36
See application file for complete search history.

(56) References Cited

U.S. PATENT DOCUMENTS

| | | | |
|---|---|---|---|
| 5,594,469 A | 1/1997 | Freeman et al. | |
| 6,610,116 B1* | 8/2003 | Avery | B01D 46/10 454/154 |
| 6,674,458 B1* | 1/2004 | Cohen-Solal | H04N 7/147 348/14.01 |
| 7,705,830 B2 | 4/2010 | Westerman et al. | |
| 8,356,254 B2 | 1/2013 | Dennard et al. | |
| 8,554,422 B2* | 10/2013 | Kneller | B64D 11/00 244/118.6 |
| 9,037,354 B2* | 5/2015 | Mondragon | G09G 5/00 701/48 |
| 9,248,840 B2* | 2/2016 | Truong | B60W 50/10 |
| 9,533,762 B2* | 1/2017 | Ayyagari | B64D 11/0015 |
| 9,536,414 B2* | 1/2017 | MacNeille | G08B 21/06 |
| 2002/0057383 A1 | 5/2002 | Iwamura | |
| 2003/0117376 A1 | 6/2003 | Ghulam | |
| 2004/0189720 A1 | 9/2004 | Wilson et al. | |
| 2004/0193413 A1 | 9/2004 | Wilson et al. | |
| 2005/0101314 A1* | 5/2005 | Levi | G08B 21/0238 455/423 |
| 2005/0134117 A1* | 6/2005 | Ito | B60R 16/0373 307/10.1 |
| 2005/0263254 A1* | 12/2005 | Sievers | B60J 1/2011 160/90 |
| 2006/0136846 A1* | 6/2006 | Im | G06F 3/017 715/863 |
| 2006/0182346 A1* | 8/2006 | Yoda | G06F 3/017 382/190 |
| 2006/0209021 A1 | 9/2006 | Yoo | |
| 2006/0284839 A1 | 12/2006 | Breed | |
| 2007/0019072 A1* | 1/2007 | Bengtsson | B60N 2/4876 348/148 |
| 2008/0104642 A1* | 5/2008 | Galipeau | H04N 7/10 725/76 |
| 2009/0109036 A1* | 4/2009 | Schalla | B64D 11/0015 340/573.1 |
| 2009/0112377 A1* | 4/2009 | Schalla | B64D 11/0015 701/3 |
| 2009/0112378 A1* | 4/2009 | Robb | B64D 11/0015 701/3 |
| 2009/0112407 A1* | 4/2009 | Kneller | B64D 11/0015 701/45 |
| 2012/0292960 A1* | 11/2012 | Guering | B64D 11/06 297/216.12 |
| 2017/0286037 A1* | 10/2017 | Sizelove | G06F 3/14 |

OTHER PUBLICATIONS

Choi et al., Visual recognition of aircraft marshalling signals using gesture phase analysis , 2008, IEEE, p. 853-858 (Year: 2008).*

* cited by examiner

AIRCRAFT HAVING GESTURE-BASED CONTROL FOR AN ONBOARD PASSENGER SERVICE UNIT

CROSS-REFERENCE TO RELATED APPLICATIONS

The present application is a continuation of U.S. patent application Ser. No. 11/927,517, entitled: An Aircraft Having Gesture-Based Control for an Onboard Passenger Service Unit, filed on Oct. 29.2007.

FIELD

The present disclosure relates generally to aircraft, and more particularly, to communication between passengers and systems onboard an aircraft.

BACKGROUND

The statements in this section merely provide background information related to the present disclosure and may not constitute prior art.

Many mobile platforms (such as trains, ships, aircraft and automobiles) employ stowage compartments in a cabin of the mobile platform to enable stowage of passenger items, such as carry-on baggage. With regard to commercial passenger aircraft, increased baggage stowage demands have required the stowage compartments to increase in size and load capacity. In addition, there is a drive to increase passenger's "personal space" (i.e., headroom) in the cabin of the aircraft. The desire for increased "personal space" in the cabin has resulted in higher ceilings and the placement of storage compartments higher in the cabins.

With the placement of stowage compartments higher in the cabin, some aircraft systems that the passenger must interface with, such as the reading light, gasper air fan and attendant or crew call button will also be placed at a higher location above the floor of the passenger cabin to further provide increased "personal space". Due to the distance between the passenger and these aircraft systems, it may be difficult for the passenger to communicate with or interface with these systems.

SUMMARY

Some example implementations provide an aircraft comprising a fuselage including a cabin with a plurality of seats, and for a seat of the plurality of seats a passenger service unit including a reading light, an attendant call button, and an air vent for a passenger seated in the seat; a camera configured to acquire an image of the passenger; and a control module coupled to the passenger serviced unit and camera, and configured to at least: receive the image of the passenger from the camera; receive non-tactile gesture preference data and dominant hand data, input by the passenger or from an associated user profile of the passenger, the non-tactile gesture preference data representing a desired non-tactile hand signal or a desired non-tactile hand gesture, and the dominant hand data specifying a dominant hand of the passenger; access a non-tactile gesture data store that includes a plurality of images of non-tactile hand signals or non-tactile hand gestures; generate non-tactile gesture data in accordance with and indicative of a non-tactile hand signal or a non-tactile gesture made by the passenger, the non-tactile gesture data being generated based on the image of the passenger, the non-tactile gesture preference data and dominant hand data, and the plurality of images of non-tactile hand signals or non-tactile hand gestures; and control one or more cabin systems including in at least one instance the reading light, attendant call button or air vent of the passenger service unit based on the non-tactile gesture data.

In some example implementations of the aircraft of the preceding example implementation, the control module being configured to generate the non-tactile gesture data includes being configured to generate the non-tactile gesture data based on a comparison between the image of the passenger and the plurality of images of non-tactile hand signals or non-tactile hand gestures.

In some example implementations of the aircraft of any preceding example implementation, the control module being configured to control the one or more cabin systems includes being configured to at least access a function data store that indicates functions associated with respective ones of the non-tactile hand signals or non-tactile hand gestures; generate function data that identifies a function of the one or more cabin systems based on a comparison between the non-tactile gesture data and the functions indicated in the function data store, the reading light; and control the one or more cabin systems including in the at least one instance the reading light, attendant call button or air vent based on the function data.

In some example implementations of the aircraft of the preceding example implementation, the control module being configured to access the function data store includes being configured to access the function data store that indicates functions including activation and deactivation of each of the reading light, the attendant call button and the air vent, each of which is associated with a respective one of the non-tactile hand signals or non-tactile hand gestures.

In some example implementations of the aircraft of any preceding example implementation, the fuselage further includes a plurality of windows, and the plurality of windows includes a window proximate the seat, and wherein the control module being configured to control the one or more cabin systems includes in at least one other instance a window shade of the window proximate the seat.

In some example implementations of the aircraft of any preceding example implementation, the aircraft further comprises an in-flight entertainment system for passenger seated in the seat, and wherein the control module being configured to control the one or more cabin systems includes in at least one other instance a window shade of the window proximate the seat.

Some example implementations provide an apparatus for control of one or more cabin systems onboard an aircraft with a fuselage including a cabin with a plurality of seats, and for a seat of the plurality of seats, a passenger service unit including a reading light, an attendant call button, and an air vent for a passenger seated in the seat, the apparatus comprising a processor and a memory storing one or more software or firmware programs that, in response to execution by the processor, cause the apparatus to at least: receive an image of the passenger from a camera; receive non-tactile gesture preference data and dominant hand data, input by the passenger or from an associated user profile of the passenger, the non-tactile gesture preference data representing a desired non-tactile hand signal or a desired non-tactile hand gesture, and the dominant hand data specifying a dominant hand of the passenger; access a non-tactile gesture data store that includes a plurality of images of non-tactile hand signals or non-tactile hand gestures; generate non-tactile gesture data in accordance with and indicative of a non-tactile hand signal or a non-tactile gesture made by the passenger, the non-tactile gesture data being generated based on the image of the passenger, the non-tactile gesture preference data and dominant hand data, and the plurality of images of non-tactile hand signals or non-tactile hand gestures; and control one or more cabin systems including in at least one instance the reading light, attendant call button or air vent of the passenger service unit based on the non-tactile gesture data.

In some example implementations of the apparatus of the preceding example implementation, the apparatus being caused to generate the non-tactile gesture data includes being caused to generate the non-tactile gesture data based on a comparison between the image of the passenger and the plurality of images of non-tactile hand signals or non-tactile hand gestures.

In some example implementations of the apparatus of any preceding example implementation, the apparatus being caused to control the one or more cabin systems includes being caused to at least access a function data store that indicates functions associated with respective ones of the non-tactile hand signals or non-tactile hand gestures; generate function data that identifies a function of the one or more cabin systems based on a comparison between the non-tactile gesture data and the functions indicated in the function data store, the reading light; and control the one or more cabin systems including in the at least one instance the reading light, attendant call button or air vent based on the function data.

In some example implementations of the apparatus of the preceding example implementation, the apparatus being caused to access the function data store includes being caused to access the function data store that indicates functions including activation and deactivation of each of the reading light, the attendant call button and the air vent, each of which is associated with a respective one of the non-tactile hand signals or non-tactile hand gestures.

In some example implementations of the apparatus of any preceding example implementation, the fuselage further includes a plurality of windows, and the plurality of windows includes a window proximate the seat, and wherein the apparatus being caused to control the one or more cabin systems includes in at least one other instance a window shade of the window proximate the seat.

In some example implementations of the apparatus of any preceding example implementation, the aircraft further includes an in-flight entertainment system for the passenger seated in the seat, and wherein the apparatus being caused to control the one or more cabin systems includes in at least one other instance a window shade of the window proximate the seat.

Some example implementations provide a method for control of one or more cabin systems onboard an aircraft with a fuselage including a cabin with a plurality of seats, and for a seat of the plurality of seats, a passenger service unit including a reading light, an attendant call button, and an air vent for a passenger seated in the seat, the method comprising acquiring an image of the passenger; receiving non-tactile gesture preference data and dominant hand data, input by the passenger or from an associated user profile of the passenger, the non-tactile gesture preference data representing a desired non-tactile hand signal or a desired non-tactile hand gesture, and the dominant hand data specifying a dominant hand of the passenger; accessing a non-tactile gesture data store that includes a plurality of images of non-tactile hand signals or non-tactile hand gestures; generating non-tactile gesture data in accordance with and indicative of a non-tactile hand signal or a non-tactile gesture made by the passenger, the non-tactile gesture data being generated based on the image of the passenger, the non-tactile gesture preference data and dominant hand data, and the plurality of images of non-tactile hand signals or non-tactile hand gestures; and controlling one or more cabin systems including in at least one instance the reading light, attendant call button or air vent of the passenger service unit based on the non-tactile gesture data.

In some example implementations of the method of the preceding example implementation, generating the non-tactile gesture data includes generating the non-tactile gesture data based on a comparison between the image of the passenger and the plurality of images of non-tactile hand signals or non-tactile hand gestures.

In some example implementations of the method of any preceding example implementation, controlling the one or more cabin systems includes at least accessing a function data store that indicates functions associated with respective ones of the non-tactile hand signals or non-tactile hand gestures; generating function data that identifies a function of the one or more cabin systems based on a comparison between the non-tactile gesture data and the functions indicated in the function data store, the reading light; and controlling the one or more cabin systems including in the at least one instance the reading light, attendant call button or air vent based on the function data.

In some example implementations of the method of the preceding example implementation, accessing the function data store includes accessing the function data store that indicates functions including activation and deactivation of each of the reading light, the attendant call button and the air vent, each of which is associated with a respective one of the non-tactile hand signals or non-tactile hand gestures.

In some example implementations of the method of any preceding example implementation, the fuselage further includes a plurality of windows, and the plurality of windows includes a window proximate the seat, and wherein controlling the one or more cabin systems includes in at least one other instance a window shade of the window proximate the seat.

In some example implementations of the method of any preceding example implementation, the aircraft further includes an in-flight entertainment system for the passenger seated in the seat, and wherein controlling the one or more cabin systems includes in at least one other instance a window shade of the window proximate the seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the present disclosure, application, or uses. Although the following description is related generally to a system and method for alternative communication onboard a mobile platform (such as an aircraft, ship, spacecraft, train or land-based motor vehicle), it will be understood that the system and method for alternative communication, as described and claimed herein, may be used with any appropriate application where it would be desirable for an individual to interface with a system without requiring direct physical contact with the system, such as a home entertainment system. Therefore, it will be understood that the following discussion is not intended to limit the scope of the appended claims to only mobile platforms and mobile platform based systems.

Figure 1:
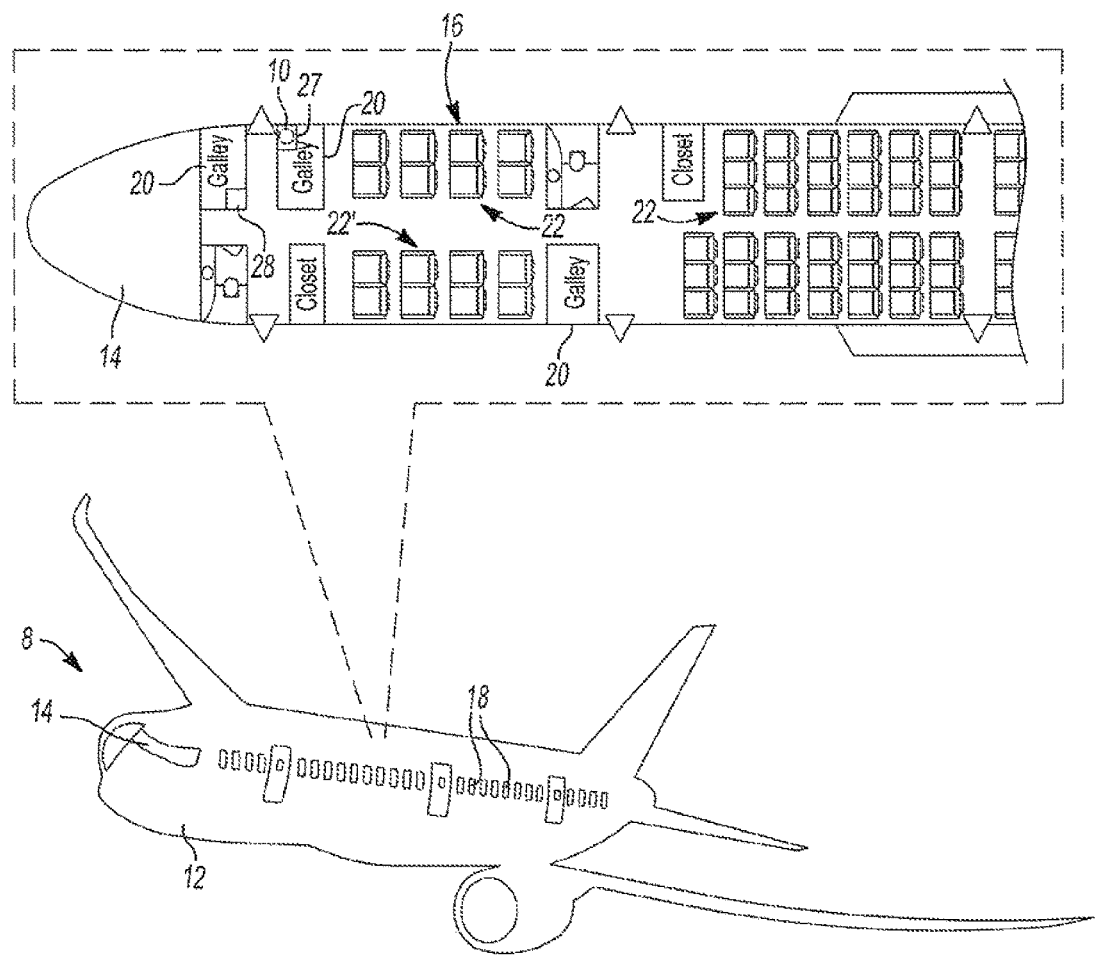
FIG. 1 is a schematic illustration of a mobile platform incorporating the system and method for alternative communication according to the principles of the present disclosure.
Figure 2:
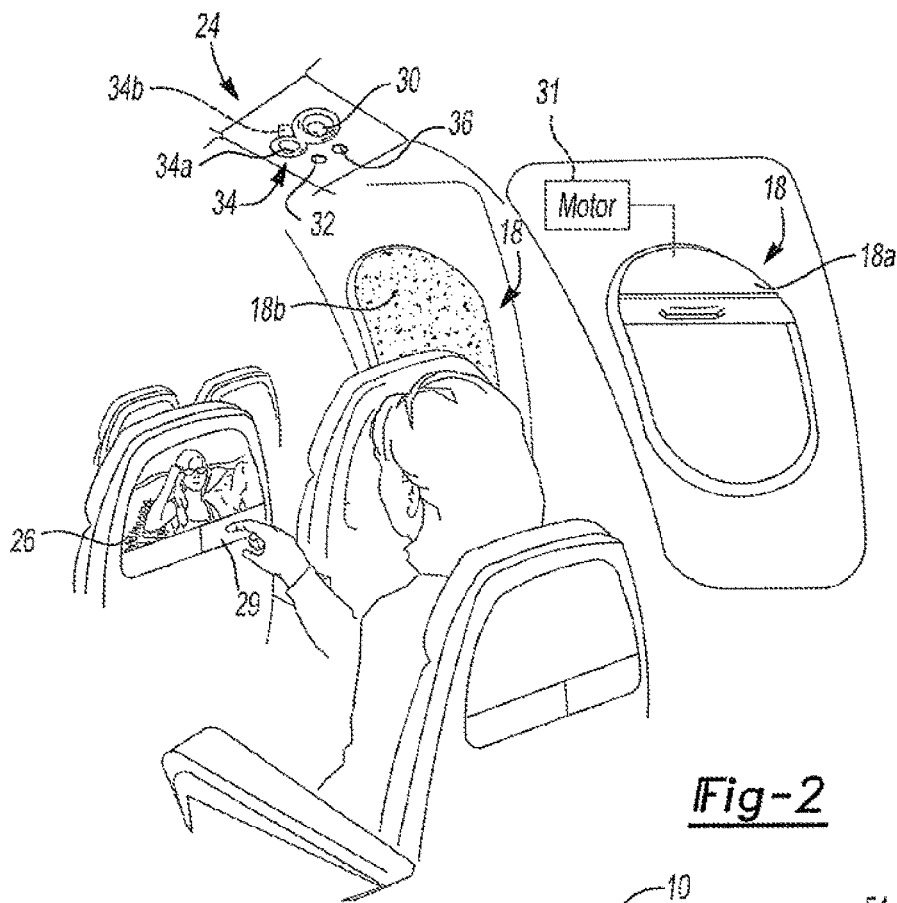
FIG. 2 is schematic illustration of a passenger onboard the mobile platform interacting with an in-flight entertainment system and positioned under an exemplary passenger service unit.

With reference to FIGS. 1 and 2, a schematic illustrates an exemplary mobile platform 8 that employs a system and a method for alternative communication through an alternative communication control module 10. The mobile platform, in this example, is a passenger aircraft 8 that includes a cockpit 14, a cabin 16 and at least one window 18. The cabin 16 includes at least one crew area 20, at least one passenger seat 22, a passenger service unit 24 (FIG. 2) and optionally, an in-flight entertainment (IFE) system 26 (FIG. 2). The cabin 16 may also include a controller 27 (FIG. 1).

With reference to FIG. 1, the at least one crew area 20 may include a control panel 28 that can enable the crew to interface with the alternative communication control module 10. Thus, the control panel 28 may include at least one user input device and display means (not specifically shown), such as a GUI, for example, however, any suitable user input device and display means may be employed, such as, without limitations, button(s), a touch screen and/or a display screen. With reference to FIG. 2, the passenger service unit 24 may include at least one reading light 30, at least one attendant call button 32, at least one air vent or gasper 34, and a camera 36. Each of the reading light 30, attendant call button 32, air vent or gasper 34 and camera 36 may be in communication with and responsive to the controller 27 through either a wired or wireless connection (not specifically shown). The reading light 30, when activated by the controller 27, may illuminate the associated passenger seat 22. The attendant call button 32, when activated by the controller 27, transmits a signal to the control panel 28 in the crew area 20 that assistance is needed at the particular passenger seat 22. The vent or gasper 34 may be generally rotatable between an open and a closed position to enable, disable, or control a flow of cabin air. Thus, the vent or gasper 34 may act as a climate control for the associated passenger seat 22. The vent or gasper 34 includes a housing 34a rotatable between an open and a closed position by a motor 34b (may be functionally similar to the aperture setting on a camera) in communication with and responsive to the controller 27. Upon receipt of a signal from the controller 27, the motor 34b moves the housing 34a into a desired position. The camera 36 may comprise any suitable device capable of acquiring an image of the passenger in the passenger seat 22 and transmitting that acquired image to the controller 27, as generally known in the art.

The in-flight entertainment (IFE) system 26 may be coupled to the passenger seat 22, and may be responsive to and in communication with the controller 27 through a wired or a wireless connection (not specifically shown). The IFE system 26 enables the passenger to remain entertained throughout the duration of the flight of the aircraft 8, as is generally known. The IFE system 26 may include an input device 29, such as, without limitations, a GUI, a touch screen, a button, a touch pen, a keyboard, a joystick, a mouse or any other suitable user input device to enable the passenger to interface with the IFE system 26. In addition, the alternative communication control module 10 may be used by the passenger to interface with the IFE system 26. For example, the communication control module 10 may be used to turn the IFE system 26 off or on, to control the selection of a menu on the IFE system 26, to control the starting or stopping of a feature displayed on the IFE system 26, such as a movie, or to fast forward or reverse the feature displayed on the IFE system 26, or to control volume, select a song list, etc. The controller 27 may comprise a computer and/or processor, and memory to hold instruction and data related to the alternative communication control module 10.

The window 18 of the aircraft 8 may include a shade 18a or an adjustable tinting system 18b (not shown). The shade 18a may have a motor 31 that is in communication with and responsive to the controller 27 to raise or lower the shade 18a. For example, the window 18 of the aircraft 8 may include a shade 18a similar to the shade detailed in U.S. Pat. No. 5,515,898, however, any suitable device could be employed to raise or lower the window shade 18a. The adjustable tinting system 18b is in communication with and responsive to the controller 27 to adjust the opacity of the window 18 upon receipt of a signal from the controller 27. An exemplary window tinting system 18b is described in commonly assigned U.S. Patent Publication No. 2005/0200934, hereby incorporated by reference in its entirety.

Figure 3:
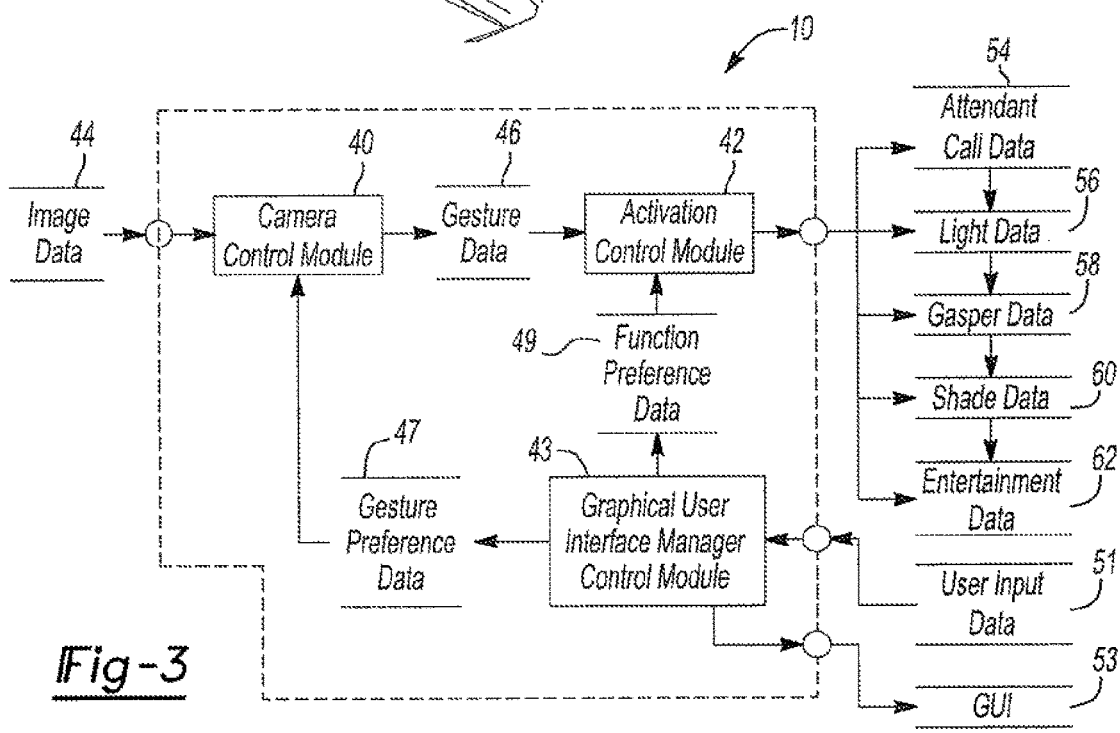
FIG. 3 is a dataflow diagram illustrating an exemplary alternative communication control system of the present disclosure.

With reference to FIG. 3, the alternative communication control module 10 for the aircraft 8 is illustrated in accordance with the teachings of the present disclosure. The alternative communication control module 10 enables the passengers onboard the aircraft 8 to interact with the window 18, passenger service unit 24 and the IFE system 26. In this regard, the alternative communication control module 10 operates to control the functions associated with the window 18, the passenger service unit 24 and the IFE system 26 without requiring passengers to strain to reach the window 18 or the user input devices (reading light 30, call button 32, vent or gasper 34, user input device 29) on either the passenger service unit 24 or the IFE system 26. This enables passengers who are unable to reach or control these systems to interface with the window 18, passenger service unit 24 and the IFE system 26 without disrupting surrounding passengers, which improves the overall passenger experience.

As used herein, the term "module" refers to an application specific integrated circuit (ASIC), an electronic circuit, a processor (shared, dedicated, or group) and memory that executes one or more software or firmware programs, to a combinational logic circuit, and/or to other suitable components that provide the described functionality. In FIG. 3, a dataflow diagram illustrates various components of an alternative communication system that is embedded within the alternative communication control module 10. Various embodiments of the alternative communication control module 10 may include any number of sub-modules embedded within the alternative communication control module 10. The sub-modules shown in FIG. 3 may be combined and/or further partitioned to similarly control the alternative communication of the passengers onboard the aircraft 8. Inputs to the alternative communication control module 10 are received from other control modules (not shown) within the aircraft 8, and/or determined by other sub-modules (not shown) within the alternative communication control module 10 (not shown). In FIG. 3, the alternative communication control module 10 includes a camera control module 40, an activation control module 42 and a graphical user interface (GUI) manager control module 43.

Figure 4:
FIG. 4 is a schematic illustration of a passenger onboard the mobile platform interacting with the passenger service unit via the alternative communication system.

The camera control module 40 receives as input image data 44 and gesture preference data 47. The image data 44 comprises an image of the passenger in the passenger seat 22. The gesture preference data 47 comprises data received from the user input device 29 that identifies a particular image data 44 as a gesture 45. Based on the image data 44 and the gesture preference data 47, the camera control module 40 sets gesture data 46 for the activation control module 42. The gesture data 46 comprises at least one hand signal, hand motion or gesture 45 made by the passenger in the passenger seat 22, as shown in FIG. 4.

Figure 5:
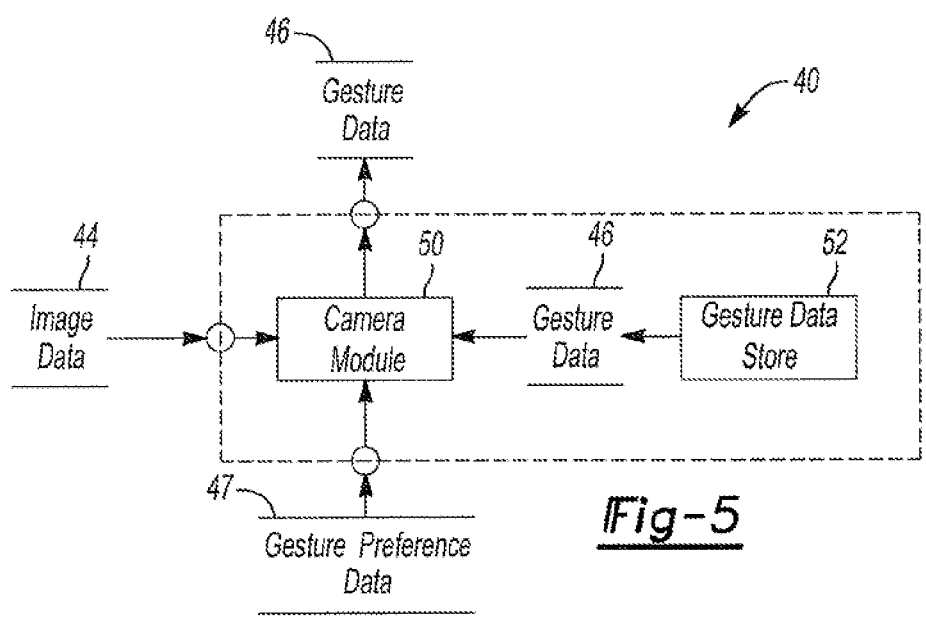
FIG. 5 is a dataflow diagram illustrating an exemplary camera control system of the present disclosure.

With reference to FIG. 5, a dataflow diagram illustrates an exemplary camera control system that may be embedded within the camera control module 40. The camera control module 40 includes a camera module 50 and a gesture data store 52. The camera module 50 receives as input the image data 44 and the gesture preference data 47. Based on the image data 44 and the gesture preference data 47, the camera module 50 may identify if a gesture 45 (FIG. 4) was made by the passenger in the passenger seat 22. It should be noted that the camera control module 40 may comprise any suitable gesture recognition software, such as GestureTek™ commercially available from GestureTek, Incorporated of Sonnyvale, Calif. The camera module 50 determines if a gesture was made by comparing the image data 44 to one or more recognized gestures stored in the gesture data store 52. Thus, based on the image data 44, the camera module 50 queries the gesture data store 52 for the gesture data 46 that corresponds with the image data 44. The gesture data store 52 may comprise one or more data storage devices and may be at least one of random access memory (RAM), read only memory (ROM), a cache, a stack, or the like which may temporarily or permanently store electronic data. The gesture data store 52 stores electronic data associated with recognized hand signals or hand gestures that may be made by a passenger to interface with either the window 18, the passenger service unit 24 or the IFE system 26 as will be discussed. In addition, the gesture data store 52 may comprise electronic data associated with hand signal or gesture 45 specified by the passenger through the gesture preference data 47. Thus, the gesture data store 52 may comprise electronic data that includes images of particular recognized hand signals or gestures so that the camera module 50 may determine the gesture made by the passenger in the image data 44. Based on the image data 44 and the gesture preference data 47, the camera module 50 outputs the gesture data 46.

With reference back to FIG. 3, the activation control module 42 receives the gesture data 46 and function preference data 49 as input. The function preference data 49 comprises data received from the user input device 29 that associates a gesture 45 with a desired function specific to the passenger. The activation control module 42 determines from the gesture data 46 and the function preference data 49, which desired function of the passenger service unit 24 and/or the IFE system 26 the passenger wishes to activate or deactivate. In this regard, the passenger may interact with the passenger service unit 24 and/or the IFE system 26 by using hand signals or gestures (FIG. 4). Thus, based on the gesture data 46, the activation control module 42 outputs call data 54, light data 56, gasper data 58, shade data 60 and entertainment data 62. The call data 54 comprises a signal to activate the attendant call button 32 to notify the crew that assistance is needed at that particular passenger seat 22. The light data 56 comprises a signal to turn the reading light 30 on or off. The gasper data 58 comprises a signal to turn the vent or gasper 34 on or off, or to increase or decrease the speed of the vent or gasper 34. The shade data 60 comprises a signal to raise or lower the shade 18a or to adjust the opacity of the window 18, depending upon the configuration of the window 18. The entertainment data 62 comprises a signal to control various features of the IFE system 26, such as the same features that are commonly controlled through on-screen touch commands or remote buttons, for example, but not limited to, power, menu select, start, stop, fast forward and rewind.

Figure 6:
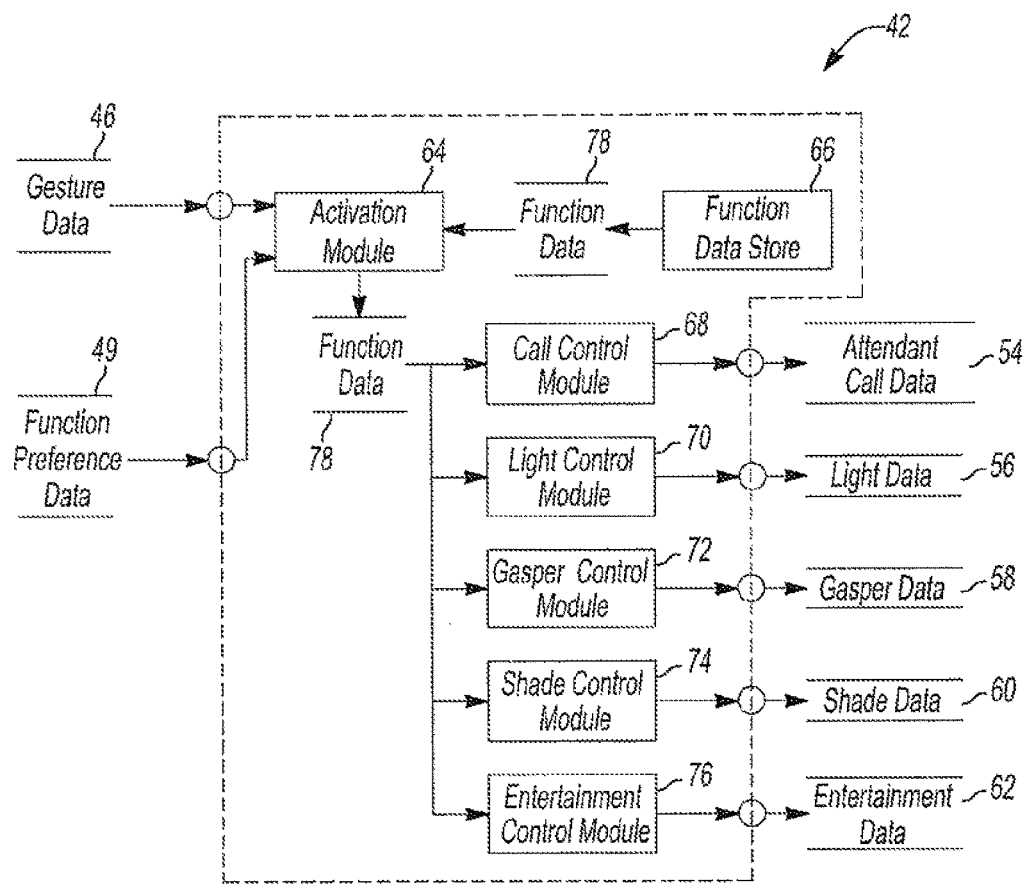
FIG. 6 is a dataflow diagram illustrating an exemplary activation system according to the principles of the present disclosure.

With reference to FIG. 6, a dataflow diagram illustrates an exemplary activation system that may be embedded within the activation control module 42. The activation control module 42 may include an activation module 64, a function data store 66, a call control module 68, a light control module 70, a gasper control module 72, a shade control module 74 and an entertainment control module 76. The activation module 64 receives as input the gesture data 46 and the function preference data 49. Given the gesture data 46 and the function preference data 49, the activation module 64 queries the function data store 66 for function data 78 that corresponds with the gesture data 46. The function data store 66 may comprise one or more data storage devices and may be at least one of random access memory (RAM), read only memory (ROM), a cache, a stack, or the like which may temporarily or permanently store electronic data. The function data store 66 stores electronic data that indicates which function corresponds with the particular recognized gesture made by the passenger. In this regard, based on the gesture 45 made by the passenger, the activation module 64 determines, based on the data in the function data store 66, which of the window 18, passenger service unit 24 or IFE system 26 the passenger is trying to communicate with using hand signals or gestures 45. It should be noted that the function data store 66 may also store electronic data that includes user defined functions (i.e. function preference data 49) for given gesture data 46, based on input received from the user input device 29. In addition, if the passenger decides to calibrate the camera control module 40, then the passenger could specify which hand in the image data 44 comprises a dominant hand or the alternative communication control module 10 select a default hand to monitor, such as a right hand, for example. Based on the gesture data 46, the activation control module 42 sets the function data 78 for the call control module 68, light control module 70, gasper control module 72, shade control module 74 and the entertainment control module 76. Exemplary function data 78 for a particular hand gesture or gesture data 46 is shown in Table 1.

TABLE 1

| Exemplary Gesture Data 46 | Exemplary Function Data 78 |
| --- | --- |
| Hand Palm Down on Lap | IFE On |
| Hand Palm Up on Lap | IFE Off |
| Index Finger Pointing Ahead - Up or Down | IFE Menu Select |
| Sweep of Hand | IFE Selected Item Start |
| Fist | IFE Selected Item Stop |
| Index Finger Pointing Right | IFE Fast Forward |
| Index Finger Pointing Left | IFE Reverse |
| Index Finger and Thumb Extended into an "L" Shape | Reading Light On |
| Index Finger and Thumb Brought Together | Reading Light Off |
| Palm Lowered from Shoulder Height | Dimmable Window Darkens |
| Palm Raised from Lap | Dimmable Window Lightens |
| Form Hand into a "C" Shape | Activate Attendant Call Button |
| Palm by Side of Face | Ventilation Fan On |
| Fist by Side of Face | Ventilation Fan Off |
| Index Finger Circular Motion | Increase/Decrease Ventilation Fan Speed |

In addition, it will be understood that these gestures are merely exemplary, and further, the passenger may interact with the IFE system 26 to program the alternative communication control module 10 to associate particular user defined gestures with functions of the passenger service unit 24 and the IFE system 26 (not specifically shown). For example, the passenger could use the user input device 29 to interface with one or more graphical user interfaces (not shown) define specific hand gestures for desired functions of the passenger service unit 24 and IFE system 26.

With continuing reference to FIG. 6, the call control module 68 receives as input the function data 78. If the function data 78 comprises a signal to activate the attendant call button 32, then the call control module 68 outputs the call data 54 in the form of a signal at the location the call was made (i.e., activation of a light source coupled to the passenger service unit 24, not specifically shown) or through the control panel 28 in the crew area 20.

The light control module 70 receives as input the function data 78. If the function data 78 comprises a signal to turn the reading light 30 on or off, or up or down, then the light control module 70 outputs the corresponding light data 56. The gasper control module 72 receives as input the function data 78. If the function data 78 comprises a signal to turn the vent or gasper 34 on or off, or to increase or decrease the speed of the vent or gasper 34, then the gasper control module 72 outputs the gasper data 58. The shade control module 74 receives as input the function data 78. If the function data 78 comprises a signal to raise or lower the shade 18a, or to increase or decrease the opacity of the window 18, then the shade control module 74 outputs the shade data 60. The entertainment control module 76 receives as input the function data 78. If the function data 78 comprises a signal to activate or deactivate the IFE system 26 or activate any of the many internal controls of the IFE 26, then the entertainment control module 76 outputs the entertainment data 62.

Figure 7A:
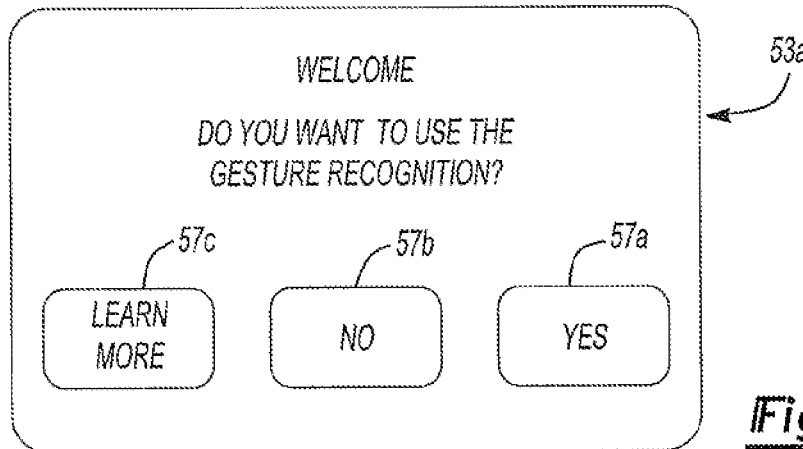
FIG. 7A is an exemplary graphical user interface that enables a passenger onboard the mobile platform to interact with the alternative communication control system.
Figure 7B:
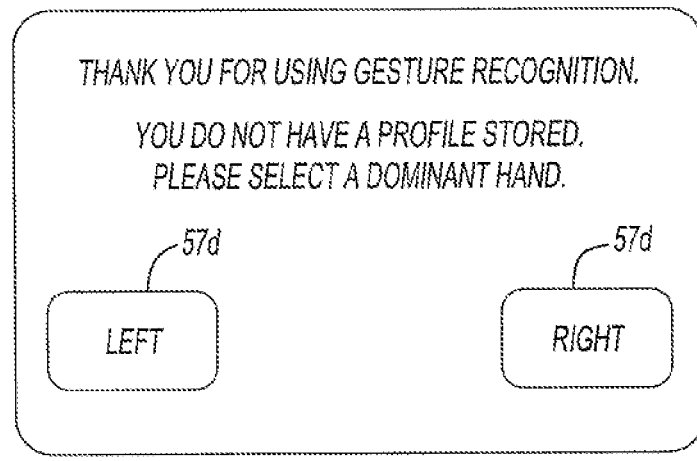
FIG. 7B is an exemplary graphical user interface that enables a passenger onboard the mobile platform to interact with the alternative communication control system.
Figure 7C:
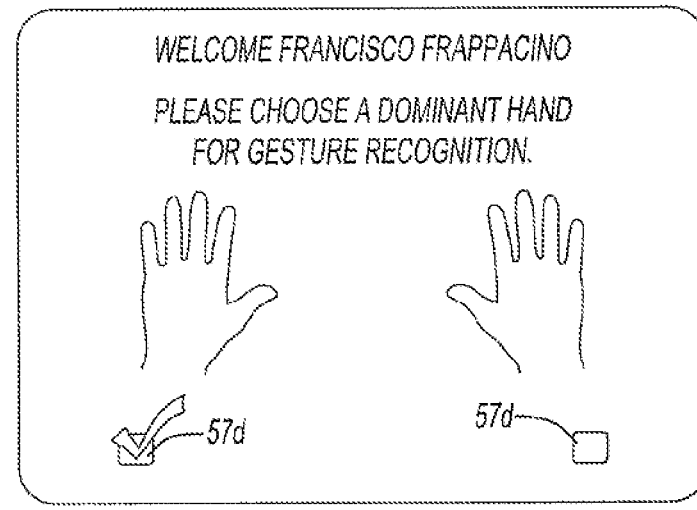
FIG. 7C is an exemplary graphical user interface that enables a passenger onboard the mobile platform to interact with the alternative communication control system.

With reference back to FIG. 3, the GUI manager control module 43 receives as input user input data 51. The user input data 51 comprises a request to enable or disable the alternative communication control module 10, to learn more about the alternative communication control module 10 and to specify particular movements as gestures 45 that activate desired functions. Based on the user input data 51, the GUI manager control module 43 outputs a GUI 53, and sets the gesture preference data 47 and the function preference data 49. For example, with reference to FIG. 7A, the GUI 53 may comprise a first GUI 53a that includes one or more selectors 57 to enable the passenger to select whether to enable (selector 57a), disable (selector 57b) or learn more (selector 57c) about the alternative communication control module 10. If the passenger selects the enable selector 57a, and the passenger does not have a stored user profile, then the GUI manager control module 43 outputs a second GUI 53b, as illustrated in FIG. 7B. The second GUI 53b informs the passenger that they have no profile, and includes hand selectors 57d to enable the passenger to specify a dominant hand. In addition, with reference to FIG. 7C, if the passenger has a stored user profile, then the GUI manager control module 43 outputs a third GUI 53c that is customized to the passenger, while also providing hand selectors 57d to enable the passenger to choose a dominant hand.

Figure 7D:
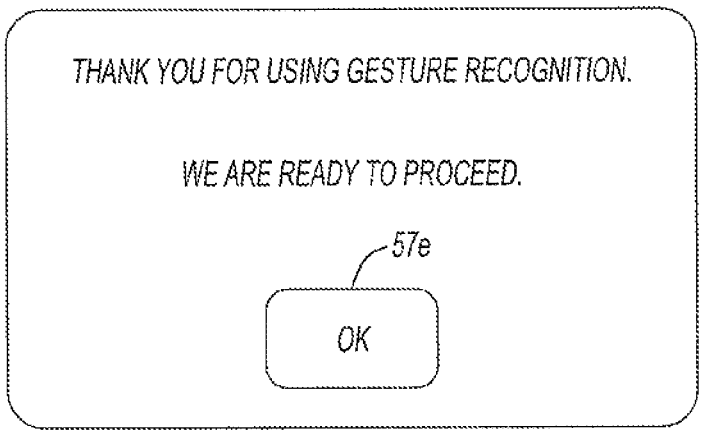
FIG. 7D is an exemplary graphical user interface that enables a passenger onboard the mobile platform to interact with the alternative communication control system.

After the passenger has selected a dominant hand from the hand selectors 57d, or if the passenger has a stored dominant hand, then based on the user input data 51, the GUI manager control module 43 outputs a fourth GUI 53d, as illustrated in FIG. 7D. The fourth GUI 53c prompts the user to indicate that it is appropriate to proceed, and includes a selector 57e.

Figure 7E:
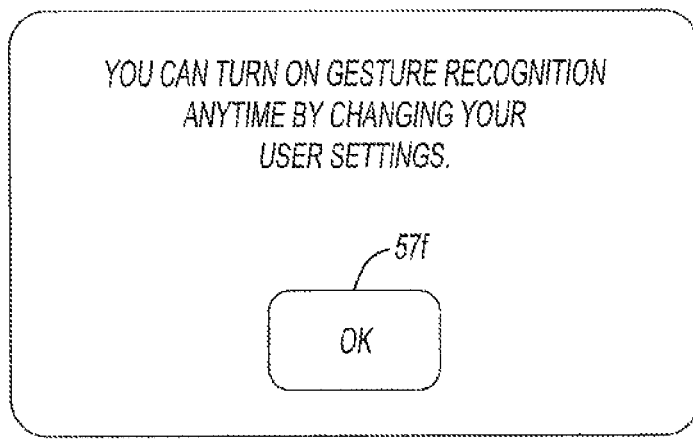
FIG. 7E is an exemplary graphical user interface that enables a passenger onboard the mobile platform to interact with the alternative communication control system.
Figure 7F:
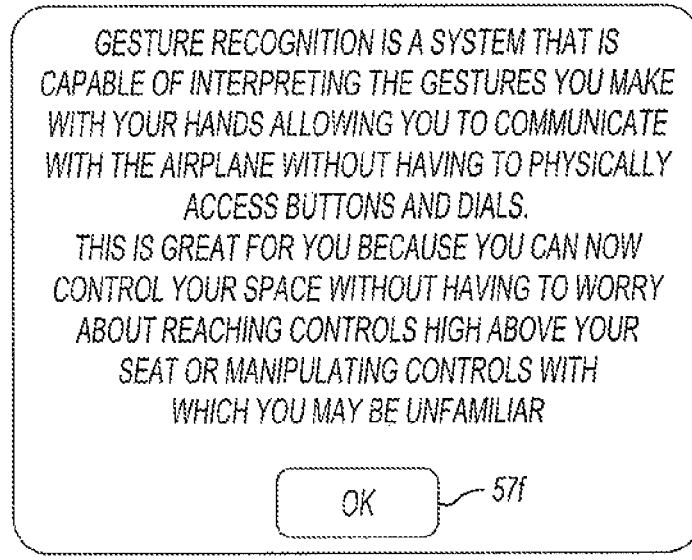
FIG. 7F is an exemplary graphical user interface that enables a passenger onboard the mobile platform to interact with the alternative communication control system.

With reference to FIG. 7E, if the passenger selects the disable selector 57b, then the GUI manager control module 43 outputs a fourth GUI 53d. The fifth GUI 53e instructs the passenger that the alternative communication control module 10 may be later enabled, if desired, and includes a selector 57f to verify that the passenger has received and/or read this information. With reference to FIG. 7F, if the passenger selects the learn more selector 57c, then the GUI manager control module 43 outputs a sixth GUI 53f. The sixth GUI 53f may include text to explain the alternative communication control module 10 to the passenger, and a selector 57g to enable the passenger to verify that the passenger has read and/or received this information.

Figure 7G:
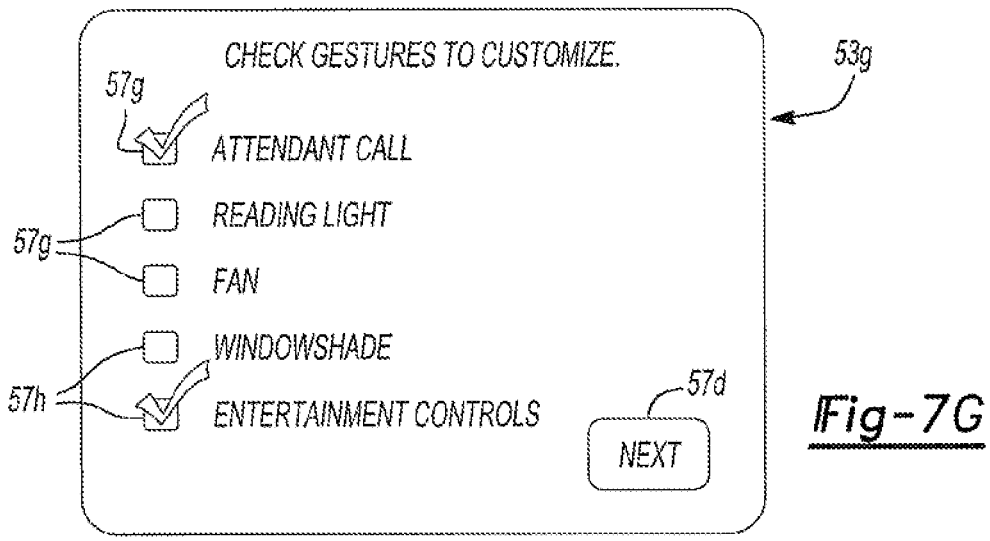
FIG. 7G is an exemplary graphical user interface that enables a passenger onboard the mobile platform to interact with the alternative communication control system.
Figure 7H:
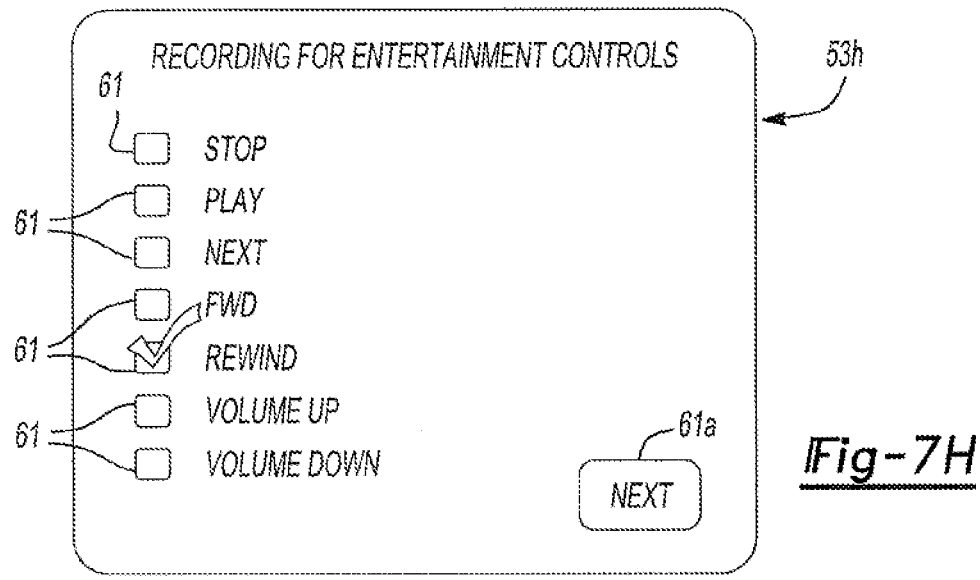
FIG. 7H is an exemplary graphical user interface that enables a passenger onboard the mobile platform to interact with the alternative communication control system.

With reference to FIG. 7G, the GUI manager control module 43 may also output a seventh GUI 53g to enable the passenger to customize specific gestures for specific functions, so that the passenger may generate gesture preference data 45 and function preference data 47 via the seventh GUI 53g. The seventh GUI 53g may include a list of function selectors 57g to which function preference data 47 may be created, such as "Attendant Call" or attendant call button 32, "Reading Light" or reading light 30, "Fan," or gasper 34, "Windowshade" or shade 18, and "Entertainment Controls" or controls for the IFE system 26. The seventh GUI 53g also includes a next selector 57h so that when the passenger has made their selections, the GUI manager control module 43 may output an eight GUI 53h. In one example, with reference to FIG. 7H, if the "Entertainment Controls" selector 57g is selected, the GUI manager control module 43 may output a GUI 53h that includes a list of specific function selectors 61 to enable the passenger to choose one of several functions to record gesture preference data 45 for. The GUI 53h may also include a next selector 61b so that the passenger may advance to another GUI 53 after making a desired selection.

Figure 7I:
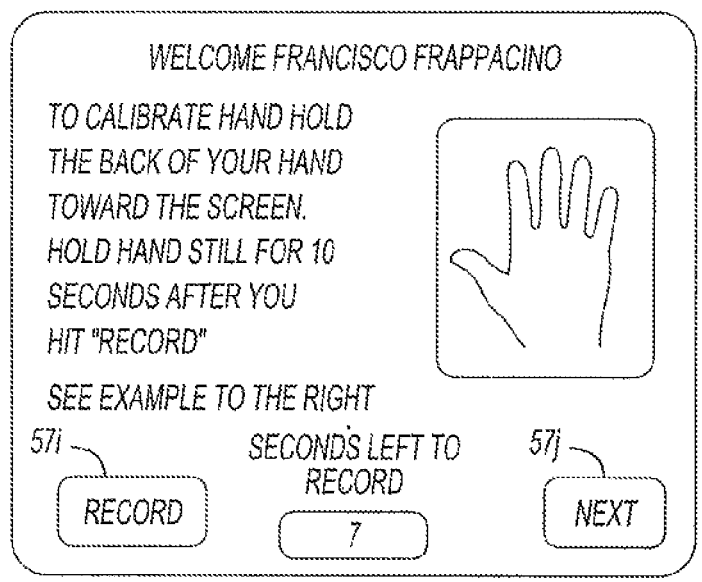
FIG. 7I is an exemplary graphical user interface that enables a passenger onboard the mobile platform to interact with the alternative communication control system.
Figure 7J:
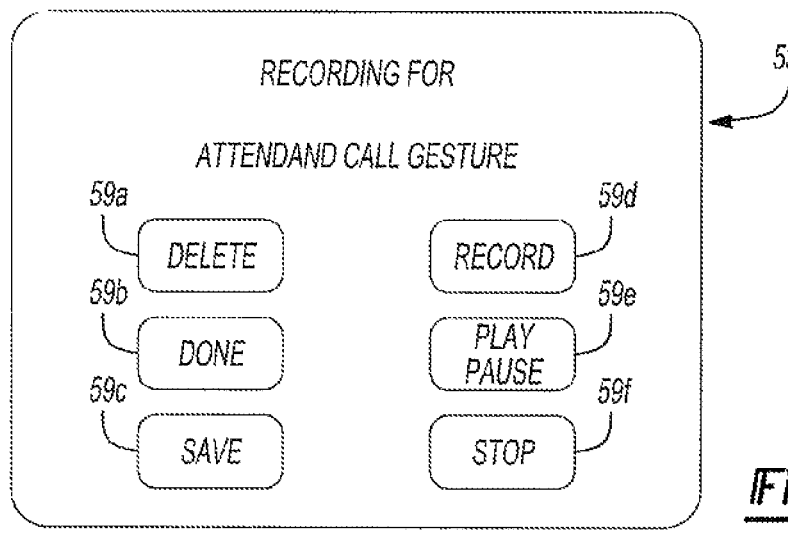
FIG. 7J is an exemplary graphical user interface that enables a passenger onboard the mobile platform to interact with the alternative communication control system.

With reference to FIG. 7I, the eighth GUI 53i records the dominant hand of the passenger so that the alternative communication control module 10 may acquire image data 44 to calibrate the alternative communication control module 10 to the passenger. The eighth GUI 53i may include a record selector 57i, a next selector 57j and instructional text. The record selector 57i enables the passenger to record a desired gesture or generate gesture preference data 45. The next selector 57j enables the passenger to go to the next GUI. Thus, if the passenger selects the next selector 57j, the GUI manager control module 43 outputs a ninth GUI 53j, as illustrated in FIG. 7J.

The ninth GUI 53j enables the passenger to control the generation of the gesture preference data 45 for the desired function. In one example, the ninth GUI 53j enables the passenger to set gesture preference data 45 for activating the attendant call button 32. The ninth GUI 53j may include appropriate controls to enable the passenger to record the gesture preference data 45, such as a "Delete" selector 59a, a "Done" selector 59b. a "Save" selector 59c, a "Record" selector 59d, a "Play/Pause" selector 59e and a "Stop" selector 59f.

Figure 8:
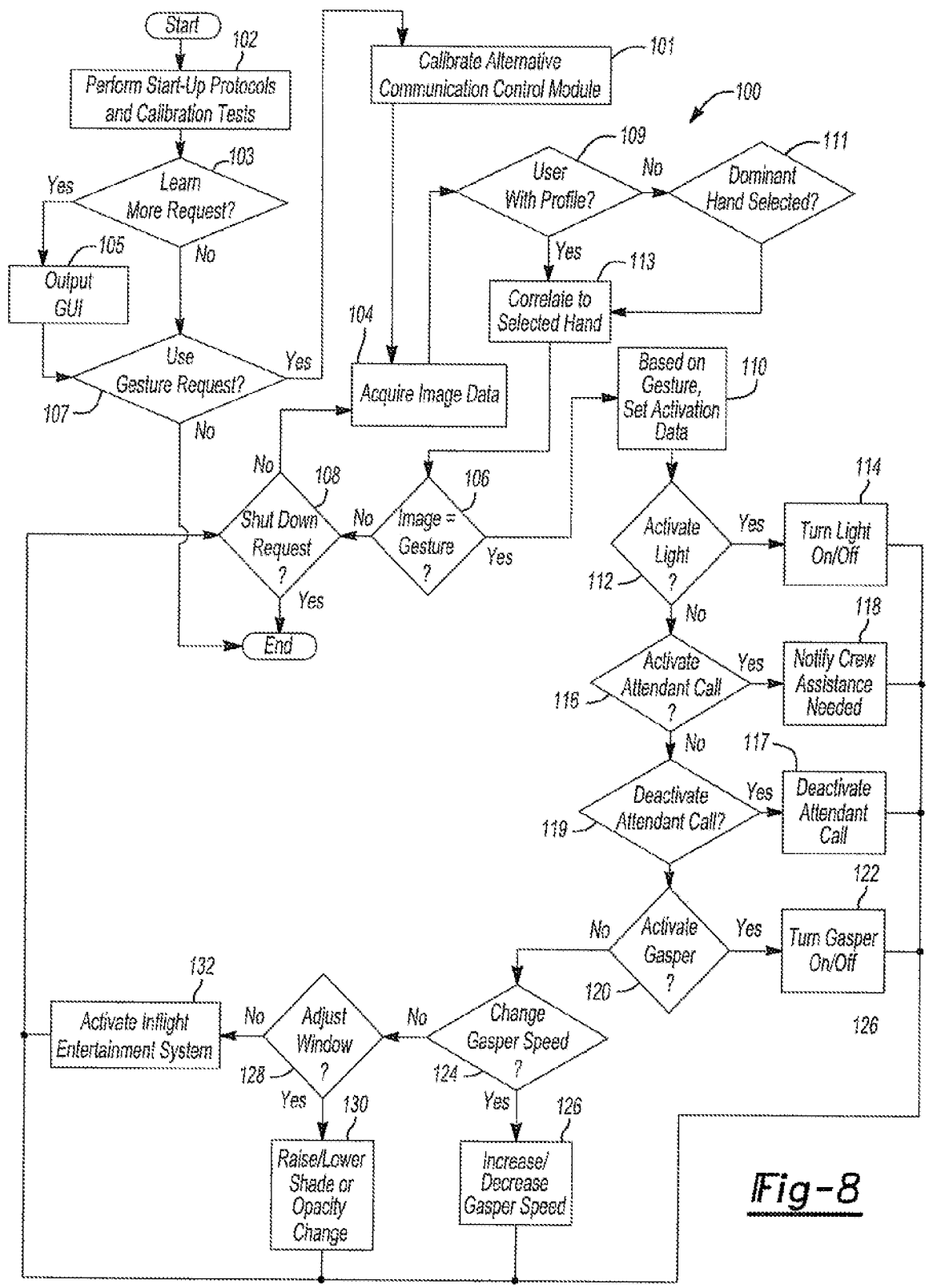
FIG. 8 is a flowchart illustrating an operational sequence for the alternative communication control system of FIG. 3.

With reference to FIG. 8, a process flow diagram illustrates an exemplary operational sequence 100 performed by the alternative communication control module 10. At operation 102, the method performs a start-up test and start-up calibration. Start up and calibration may be performed by a crew member through the control panel 28 or automatically at startup of the alternate control module to establish the default settings for the alternative communication control module 10. At operation 103, the method determines if a request to learn more about the alternative communication control module 10 has been received via the user input device 29. If a request has been received, then the method goes to operation 105, at which the method outputs the GUI 53 that describes how the alternative communication control module 10 operates. At operation 107, the method determines if a request has been received from the user input device 29 to enable the alternative communication control module 10. If a request has been received to enable the alternative communication control module 10, the method outputs the GUI 53 to enable the passenger to calibrate the alternative communication control module 10 at operation 101, and then the method goes to operation 104. Otherwise, the method ends.

At operation 104, the method acquires image data 44 of the passenger from the camera 36. At operation 109, the method determines if the passenger has a user profile stored in the gesture data store 52. The user profile may be generated from the passenger's prior use of the alternative communication control module 10, or the passenger may generate a user profile prior to traveling on the aircraft 8, which may then be input to the alternative communication control module 10 from a portable storage device, if desired. If the passenger has a stored profile in the gesture data store 52, then the method goes to operation 113.

If the passenger 52 does not have a stored user profile, then the method determines at operation 111 if the passenger has input a desired dominant hand to which the camera control module 40 may observe for image data 44. Then, the method goes to operation 113, in which the method correlates the image data 44 to the selected dominant hand, with the dominant hand selected based on either data retrieved from the user profile, or from the user input data 47.

At operation 106, the method determines if the image in the image data 44 comprises a gesture. The method may determine if the image in the image data 44 comprises a gesture 45 by comparing the image data 44 to the recognized gestures 45 queried from the gesture data store 52. If the method determines that the image data 44 does not include a gesture 45, then the method goes to operation 108. At operation 108, the method determines if a power down shut down or gesture recognition capability deactivation request has been received. If a shut down or gesture recognition capability deactivation request has been received, then the method ends. Otherwise, the method loops to operation 104.

If the method determines that the image data 44 comprises a gesture 45, then the method goes to operation 110. At operation 110, the method determines the function data 78 based on the gesture data 46. The method determines the function data 78 by querying the function data store 66 for the function that corresponds with the given gesture data 46. Then, at operation 112, the method determines if the function data 78 is for activating the reading light 30. If the function data 78 is for activating the reading light 30, then the light control module 70, at operation 114, outputs the light data 56 that either turns the reading light 30 on or off. If the function data 78 does not comprise a signal to activate the reading light 30, then the method goes to operation 116. At operation 116, the method determines if the function data 78 is for activating the attendant call button 32. If the function data 78 is for activating the attendant call button 32, then the call control module 68, at operation 118, outputs the call data 54 to activate the attendant call button 32. If the function data 78 does not comprise a signal to activate the attendant call button 32, then the method goes to operation 117.

At operation 117, the method determines if the function data 78 is for deactivating the attendant call button 32. If the function data 78 is for deactivating the attendant call button 32, then the call control module 68, at operation 119, outputs the call data 54 to deactivate the attendant call button 32. If the function data 78 does not comprise a signal to deactivate the attendant call button 32, then the method goes to operation 120.

At operation 120, the method determines if the function data 78 is for activating the vent or gasper 34. If the function data 78 is for activating the vent or gasper 34, then the gasper control module 72, at operation 122, outputs the gasper data 58 to activate the vent or gasper 34. If the function data 78 does not comprise a signal to activate the vent or gasper 34, then the method goes to operation 124. At operation 124, the method determines if the function data 78 is for increasing or decreasing the speed of the vent or gasper 34. If the function data 78 is for increasing or decreasing the speed of the vent or gasper 34, then the gasper control module 72, at operation 126, outputs the gasper data 58 to increase or decrease the speed of the vent or gasper 34. If the function data 78 does not comprise a signal to increase or decrease the speed of the vent or gasper 34, then the method goes to operation 128.

At operation 128, the method determines if the function data 78 is for adjusting the window 18. If the function data 78 is for adjusting the window 18, then the shade control module 74, at operation 130, outputs the shade data 60 to lower or raise the shade 18a or change the opacity of the window 18 with the tinting system 18b. If the function data 78 does not comprise a signal to adjust the window 18, then the method goes to operation 132. At operation 132, the method activates the appropriate IFE system 26 control for the given function data 78, such as to turn the IFE 26 on or off, activate a menu, start, stop, reverse or fast forward through a feature (such as a movie) displayed on the IFE 26. Then, the method loops to operation 108.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. An aircraft comprising a fuselage including a cabin with a plurality of seats, and for a seat of the plurality of seats:
    a passenger service unit including a reading light, an attendant call button, and an air vent for a passenger seated in the seat;
    a camera configured to acquire an image of the passenger; and
    a control module coupled to the passenger serviced unit and camera, and configured to at least:
        receive the image of the passenger from the camera;
        receive non-tactile gesture preference data and dominant hand data, input by the passenger or from an associated user profile of the passenger, the non-tactile gesture preference data representing a desired non-tactile hand signal or a desired non-tactile hand gesture, and the dominant hand data specifying a dominant hand of the passenger to monitor for the desired non-tactile hand signal or the desired non-tactile hand gesture, the dominant hand of the passenger being chosen by the passenger;
        correlate the image of the passenger to the dominant hand of the passenger specified by the dominant hand data;
        access a non-tactile gesture data store that includes a plurality of images of non-tactile hand signals or non-tactile hand gestures;
        generate non-tactile gesture data in accordance with and indicative of the desired non-tactile hand signal or the desired non-tactile gesture made by the passenger, the non-tactile gesture data being generated based on the image of the passenger correlated to the dominant hand of the passenger specified by the dominant hand data, the non-tactile gesture preference data, and the plurality of images of non-tactile hand signals or non-tactile hand gestures; and
        control one or more cabin systems including in at least one instance the reading light, attendant call button or air vent of the passenger service unit based on the non-tactile gesture data.

2. The aircraft of claim 1, wherein the control module being configured to generate the non-tactile gesture data includes being configured to generate the non-tactile gesture data based on a comparison between the image of the passenger and the plurality of images of non-tactile hand signals or non-tactile hand gestures.

3. The aircraft of claim 1, wherein the control module being configured to control the one or more cabin systems includes being configured to at least:
    access a function data store that indicates functions associated with respective ones of the non-tactile hand signals or non-tactile hand gestures;
    generate function data that identifies a function of the one or more cabin systems based on a comparison between the non-tactile gesture data and the functions indicated in the function data store, the reading light; and
    control the one or more cabin systems including in the at least one instance the reading light, attendant call button or air vent based on the function data.

4. The aircraft of claim 3, wherein the control module being configured to access the function data store includes being configured to access the function data store that indicates functions including activation and deactivation of each of the reading light, the attendant call button and the air vent, each of which is associated with a respective one of the non-tactile hand signals or non-tactile hand gestures.

5. The aircraft of claim 1, wherein the fuselage further includes a plurality of windows, and the plurality of windows includes a window proximate the seat, and
    wherein the control module being configured to control the one or more cabin systems includes in at least one other instance a window shade of the window proximate the seat.

6. The aircraft of claim 1 further comprising an in-flight entertainment system for passenger seated in the seat, and
    wherein the control module being configured to control the one or more cabin systems includes in at least one other instance a window shade of the window proximate the seat.

7. The aircraft of claim 1, wherein the control module is further configured to input the associated user profile of the passenger from a portable device, and
    wherein the control module being configured to receive the non-tactile gesture preference data and dominant hand data includes being configured to receive the non-tactile gesture preference data and dominant hand data from the associated user profile of the passenger.

8. An apparatus for control of one or more cabin systems onboard an aircraft with a fuselage including a cabin with a plurality of seats, and for a seat of the plurality of seats, a passenger service unit including a reading light, an attendant call button, and an air vent for a passenger seated in the seat, the apparatus comprising:
  a processor and a memory storing one or more software or firmware programs that, in response to execution by the processor, cause the apparatus to at least:
    receive an image of the passenger from a camera;
    receive non-tactile gesture preference data and dominant hand data, input by the passenger or from an associated user profile of the passenger, the non-tactile gesture preference data representing a desired non-tactile hand signal or a desired non-tactile hand gesture, and the dominant hand data specifying a dominant hand of the passenger to monitor for the desired non-tactile hand signal or the desired non-tactile hand gesture, the dominant hand of the passenger being chosen by the passenger;
    correlate the image of the passenger to the dominant hand of the passenger specified by the dominant hand data;
    access a non-tactile gesture data store that includes a plurality of images of non-tactile hand signals or non-tactile hand gestures;
    generate non-tactile gesture data in accordance with and indicative of the desired non-tactile hand signal or the desired non-tactile gesture made by the passenger, the non-tactile gesture data being generated based on the image of the passenger correlated to the dominant hand of the passenger specified by the dominant hand data, the non-tactile gesture preference data, and the plurality of images of non-tactile hand signals or non-tactile hand gestures; and
    control one or more cabin systems including in at least one instance the reading light, attendant call button or air vent of the passenger service unit based on the non-tactile gesture data.

9. The apparatus of claim 8, wherein the apparatus being caused to generate the non-tactile gesture data includes being caused to generate the non-tactile gesture data based on a comparison between the image of the passenger and the plurality of images of non-tactile hand signals or non-tactile hand gestures.

10. The apparatus of claim 8, wherein the apparatus being caused to control the one or more cabin systems includes being caused to at least:
  access a function data store that indicates functions associated with respective ones of the non-tactile hand signals or non-tactile hand gestures;
  generate function data that identifies a function of the one or more cabin systems based on a comparison between the non-tactile gesture data and the functions indicated in the function data store, the reading light; and
  control the one or more cabin systems including in the at least one instance the reading light, attendant call button or air vent based on the function data.

11. The apparatus of claim 10, wherein the apparatus being caused to access the function data store includes being caused to access the function data store that indicates functions including activation and deactivation of each of the reading light, the attendant call button and the air vent, each of which is associated with a respective one of the non-tactile hand signals or non-tactile hand gestures.

12. The apparatus of claim 8, wherein the fuselage further includes a plurality of windows, and the plurality of windows includes a window proximate the seat, and
  wherein the apparatus being caused to control the one or more cabin systems includes in at least one other instance a window shade of the window proximate the seat.

13. The apparatus of claim 8, wherein the aircraft further includes an in-flight entertainment system for the passenger seated in the seat, and
  wherein the apparatus being caused to control the one or more cabin systems includes in at least one other instance a window shade of the window proximate the seat.

14. The apparatus of claim 8, wherein the memory stores the one or more software or firmware programs that, in response to execution by the processor, cause the apparatus to further input the associated user profile of the passenger from a portable device, and
  wherein the apparatus being caused to receive the non-tactile gesture preference data and dominant hand data includes being caused to receive the non-tactile gesture preference data and dominant hand data from the associated user profile of the passenger.

15. A method for control of one or more cabin systems onboard an aircraft with a fuselage including a cabin with a plurality of seats, and for a seat of the plurality of seats, a passenger service unit including a reading light, an attendant call button, and an air vent for a passenger seated in the seat, the method comprising:
  acquiring an image of the passenger;
  receiving non-tactile gesture preference data and dominant hand data, input by the passenger or from an associated user profile of the passenger, the non-tactile gesture preference data representing a desired non-tactile hand signal or a desired non-tactile hand gesture, and the dominant hand data specifying a dominant hand of the passenger to monitor for the desired non-tactile hand signal or the desired non-tactile hand gesture, the dominant hand of the passenger being chosen by the passenger;
  correlating the image of the passenger to the dominant hand of the passenger specified by the dominant hand data;
  accessing a non-tactile gesture data store that includes a plurality of images of non-tactile hand signals or non-tactile hand gestures;
  generating non-tactile gesture data in accordance with and indicative of the desired non-tactile hand signal or the desired non-tactile gesture made by the passenger, the non-tactile gesture data being generated based on the image of the passenger correlated to the dominant hand of the passenger specified by the dominant hand data, the non-tactile gesture preference data, and the plurality of images of non-tactile hand signals or non-tactile hand gestures; and
  controlling one or more cabin systems including in at least one instance the reading light, attendant call button or air vent of the passenger service unit based on the non-tactile gesture data.

16. The method of claim 15, wherein generating the non-tactile gesture data includes generating the non-tactile gesture data based on a comparison between the image of the passenger and the plurality of images of non-tactile hand signals or non-tactile hand gestures.

17. The method of claim 15, wherein controlling the one or more cabin systems includes at least:
  accessing a function data store that indicates functions associated with respective ones of the non-tactile hand signals or non-tactile hand gestures;

generating function data that identifies a function of the one or more cabin systems based on a comparison between the non-tactile gesture data and the functions indicated in the function data store, the reading light; and controlling the one or more cabin systems including in the at least one instance the reading light, attendant call button or air vent based on the function data.

18. The method of claim 17, wherein accessing the function data store includes accessing the function data store that indicates functions including activation and deactivation of each of the reading light, the attendant call button and the air vent, each of which is associated with a respective one of the non-tactile hand signals or non-tactile hand gestures.

19. The method of claim 15, wherein the fuselage further includes a plurality of windows, and the plurality of windows includes a window proximate the seat, and wherein controlling the one or more cabin systems includes in at least one other instance a window shade of the window proximate the seat.

20. The method of claim 15, wherein the aircraft further includes an in-flight entertainment system for the passenger seated in the seat, and wherein controlling the one or more cabin systems includes in at least one other instance a window shade of the window proximate the seat.

21. The method of claim 15 further comprising inputting the associated user profile of the passenger from a portable device, wherein receiving the non-tactile gesture preference data and dominant hand data includes receiving the non-tactile gesture preference data and dominant hand data from the associated user profile of the passenger.

* * * * *